(12) United States Patent
Bierhuizen

(10) Patent No.: US 7,144,133 B2
(45) Date of Patent: Dec. 5, 2006

(54) TRANSFLECTIVE COLOR RECOVERY

(75) Inventor: Serge J. A. Bierhuizen, Santa Rosa, CA (US)

(73) Assignee: InFocus Corporation, Wilsonville, OR (US)

( * ) Notice: Subject to any disclaimer, the term of this patent is extended or adjusted under 35 U.S.C. 154(b) by 143 days.

(21) Appl. No.: 10/804,661

(22) Filed: Mar. 18, 2004

(65) Prior Publication Data

US 2004/0174692 A1 Sep. 9, 2004

Related U.S. Application Data

(63) Continuation-in-part of application No. 10/150,223, filed on May 17, 2002, now Pat. No. 6,899,440, and a continuation-in-part of application No. 10/150,438, filed on May 17, 2002.

(51) Int. Cl.
*F21V 9/00* (2006.01)

(52) U.S. Cl. .................. 362/293; 362/19; 362/257; 362/292; 362/583

(58) Field of Classification Search ............. 362/19, 362/257, 292, 293, 583; 359/483, 485, 487
See application file for complete search history.

(56) References Cited

U.S. PATENT DOCUMENTS

| | | | |
|---|---|---|---|
| 3,808,422 | A | 4/1974 | Handtmann et al. |
| 3,876,285 | A | 4/1975 | Schwarzmuller |
| 5,098,184 | A | 3/1992 | van den Brandt et al. |
| 5,327,270 | A | 7/1994 | Miyatake |
| 5,410,370 | A | 4/1995 | Janssen |
| 5,452,128 | A | 9/1995 | Kimura |
| 5,737,124 | A | 4/1998 | Sarayeddine |
| 5,808,709 | A | 9/1998 | Davis et al. |
| 5,822,021 | A | 10/1998 | Johnson et al. |
| 5,900,976 | A | 5/1999 | Handschy et al. |
| 5,900,985 | A | 5/1999 | Ho et al. |
| 5,953,083 | A | 9/1999 | Sharp |
| 6,024,451 | A | 2/2000 | De Vaan et al. |
| 6,064,523 | A | 5/2000 | Budd et al. |
| 6,078,363 | A | 6/2000 | Masuda et al. |
| 6,084,703 | A | 7/2000 | Dewald |
| 6,147,802 | A | 11/2000 | Itoh et al. |
| 6,227,682 | B1 | 5/2001 | Li |
| 6,266,105 | B1 | 7/2001 | Gleckman |
| 6,278,552 | B1 | 8/2001 | Ishihara et al. |
| 6,310,713 | B1 | 10/2001 | Doany et al. |
| 6,331,879 | B1 | 12/2001 | Sawai et al. |
| 6,341,867 | B1 | 1/2002 | Itoh |
| 6,739,723 | B1 | 5/2004 | Haven |
| 2001/0008470 | A1 | 7/2001 | Dewald |

(Continued)

FOREIGN PATENT DOCUMENTS

EP 1 098 536 A2 5/2001

OTHER PUBLICATIONS

Dewald, Scott et al—"40.2: Sequential Color Recapture and Dynamic Filtering: A Method of Scrolling Color" SID 01 Digest, vol. XXXII, 2001, pp. 1076-1079.

(Continued)

*Primary Examiner*—Stephen F. Husar
*Assistant Examiner*—Meghan K. Dunwiddie
(74) *Attorney, Agent, or Firm*—Schwabe Williamson & Wyatt

(57) ABSTRACT

Embodiments of the present invention include an apparatus, method and system for an illumination arrangement including a color recycling subsystem to receive reflected light from a transflective color filter along a reflectance axis that is non-coincident with an incident axis. Other embodiments may be described and claimed.

25 Claims, 8 Drawing Sheets

U.S. PATENT DOCUMENTS

2001/0035940 A1    11/2001  Bierhuizen
2002/0093499 A1*   7/2002   Penn et al. .............. 345/204
2003/0197837 A1    10/2003  Gyu et al.

OTHER PUBLICATIONS

Bachels et al., "Advanced Electronic Color Switch for Time-Sequential Projection," 2001, pp. 1080-1084.

Dewald et al., "Sequential Color Recapture and Dynamic Filtering: A Method of Scrolling Color," 2001, pp. 1076-1079.

Duelli et al., "Polarization Recovery System Based on Light Pipes," 8 pps.

Gardner et al., "New, High Performance, Durable Polarizers for Projection Displays," 2001, pp. 1287-1289.

Moench et al., "Invited Paper: New Developmetns in Projection Light Sources—Shorter Arcs and Miniaturisation," 2001, pp. 1274-1277.

Sharp et al., "High Throughput Color Switch for Sequential Color Projection," 2000, pp. 96-99.

Shimizu, "Invited Paper: Scrolling Color LCOS for HDTV Rear Projection," 2001, pp. 1072-1075.

* cited by examiner ated May 17, 2002.

TRANSFLECTIVE COLOR RECOVERY

RELATED APPLICATIONS

This application is a continuation-in-part of application Ser. No. 10/150,223, filed May 17, 2002 now U.S. Pat. No. 6,899,440 and application Ser. No. 10/150,438, filed May 17, 2002.

FIELD OF THE INVENTION

Disclosed embodiments of the invention relate to the field of color video projection systems. More specifically, disclosed embodiments of the invention relate to color recycling in color video projection systems.

BACKGROUND

Recent developments in faster switching liquid crystal and digital micromirror technologies have made single panel projection systems possible. These projection systems may use sequential or scrolling color filters to scroll color across the display, updating the display one row at a time instead of updating the entire frame. This approach is particularly useful with some liquid crystal displays that have slow response times. Color wheels and drums have been developed to provide bands of color that scroll across the display as the rows of the display are updated. These color filters effectuate the transmission of light in only one color (typically red, green, or blue) to one section of the display. The display, based on image data, selectively transmits portions of the various single color light. A transmissive display may do this by reflecting, or absorbing, light of one polarization while transmitting light in another. Non-transmitted light, due to the color filter or display, is lost in the system creating inefficiencies. This results in a dimmer display or requires a brighter light source. In a projector, a dimmer display is more difficult to view, while a brighter light source increases the power consumption, the amount of heat that needs to be dissipated, and the cost of the projector system.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION OF EMBODIMENTS OF THE INVENTION

Embodiments of the present invention relate to multimedia color projectors, and more particularly to color and/or polarization recovery in an illumination arrangement.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the embodiments of the present invention. It should also be noted that directions such as up, down, back and front may be used in the discussion of the drawings. These directions are used to facilitate the discussion of the drawings and are not intended to restrict the application of the embodiments of this invention. Therefore, the following detailed description is not to be taken in a limiting sense, and the scope of the embodiments of the present invention are defined by the appended claims and their equivalents.

Figure 1:
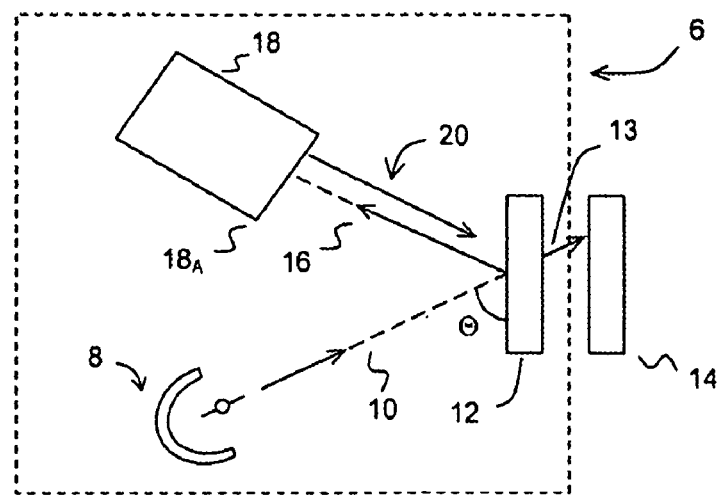
FIG. 1 is a simplified pictorial plan view of an illumination arrangement, including a color recycling subsystem, providing light to a display, in accordance with an embodiment of the present invention.

FIG. 1 illustrates a simplified pictorial plan view of an illumination arrangement 6, including a recycling subsystem 18, providing light to a display 14, in accordance with an embodiment of the present invention. A light source 8 may be optically coupled to a transflective color filter 12, such that at least a portion of the light produced by the light source 8 is received by the transflective color filter 12. The transflective color filter 12 may then transmit portions of the light to the display 14 while reflecting other portions. The recycling subsystem 18 may be optically coupled to the transflective color filter 12, such that it receives the reflected light. The reflected light may then recycled by the recycling subsystem 18 and reintroduced to the transflective color filter 12.

The light source 8 may be of a conventional design or any other design depending on the particular application. In one embodiment the light source 8 may include an arc lamp mounted at the focus of an elliptical reflector. An optional meniscus lens (not shown) may be placed between the elliptical reflector and the transflective color filter 12 to concentrate the light and reduce the cone angle. Embodiments of this invention could employ either converging (shown) or diverging light sources to accommodate for the downstream optical configuration. The white light may propagate along an incidence axis 10 and impinge upon the face of the transflective color filter 12 with an incidence angle θ. The transflective color filter 12 may transmit light within certain passbands 13 while reflecting light outside of these passbands 16. The transmitted light 13 may illuminate the display 14. While this embodiment is particularly suitable for a projection system using a transmissive display such as a liquid crystal display or a liquid crystal light valve, different embodiments could use any other reflective or transmissive display with appropriate modifications, including re-imaging the light onto a reflective panel.

The reflected light may travel along a reflectance axis 16 towards the input 18a of the recycling subsystem 18. The input 18a may be located on the reflectance axis 16, which is non-coincident with the incident axis 10, so that the optical components required to collect the reflected light do not interfere with the incident light. The reflectance axis 16 and the incident axis 10 intersect at the face of the transflective color filter 12.

The recycling subsystem 18 may redirect the reflected light back towards the transflective color filter 12 as recycled light along a recycling axis 20. In various embodiments, the recycling axis 20, i.e., the axis upon which the recycled light is reintroduced to the transflective color filter 12, may be coincident with the reflectance axis 16, the incident axis 10, or neither axis depending on the properties of the recycling subsystem. Upon reintroduction, some of the recycled light 20 may be transmitted through to the display 14. In this embodiment, the recycled light 20 may exit through the recycling subsystem input 18a, however other embodiments could provide separate input and outputs for the recycling subsystem 18.

At the display 14, the angular intensity distribution, i.e., the angular spread of the light transmission as a function of the incident angle Θ, produced by the light source 8 into the entrance pupil of the projection lens may look like two elongated hot spots above one another. The upper hot spot may come from the light from the incident axis 10, while the lower hot spot may be the light recycled back along the reflectance axis 20. The light is spread over horizontal directions orthogonal to the two vertically aligned spots (such a horizontal line can be regarded as a line going through the plane of the page in the figures). The two hot spots correspond to a central area with an average incident angle Θ close to perpendicular to the display 14. If the transflective color filter 12 and display 14 are properly selected and positioned, this elliptical spreading property of the illumination can be exploited to improve the efficiency of the system. For example, in an embodiment where the display 14 includes a digital micromirror device we can make use of the non-symmetrical pupil filling by appropriate alignment of the tilt direction of the micromirrors, which often limits the pupil size in one direction (in order to get high contrast). The pupil asymmetry may be matched with the direction orthogonal to the mirror's tilt direction to take advantage of this property.

Figure 2A:
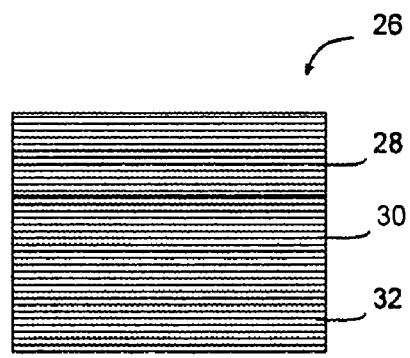
FIGS. 2A and 2B show a diagram of light produced by a scrolling transflective color filter as it might be focused on a display at two points in time, in accordance with an embodiment of the present invention.
Figure 2B:
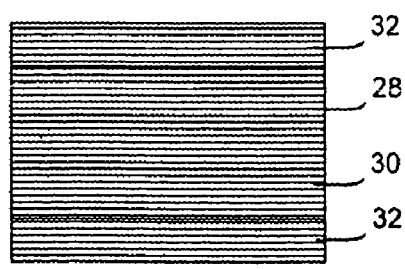

FIGS. 2A and 2B show a diagram of light produced by a scrolling transflective color filter 12 as it might be focused on the display 14, in accordance with one embodiment of this invention. A light field 26 may comprise scrolling bands of multiple colors, e.g., primary colors, which correspond to the segments of the scrolling transflective colorfilter 12. In FIG. 2a, the light field 26 is segmented into three bands, a red band 28, a green band 30, and a blue band 32. The bands move across the light field so that in FIG. 2b, which shows the same light field 26 at a later time, the bands have moved down the light field. The blue band 32 has scrolled partially off the bottom of the light field and has partially reappeared at the top. This approach allows all but a few of the rows of the display to be illuminated almost constantly. Only the rows that are changing to the next color do not contribute to the image. Black bands (not shown) can be placed between the colored bands to prevent rows that are changing from affecting the display 14.

The transflective color filter 12 may be used to synchronize the light source with the scrolling display 14 in order to illuminate each row of the display 14 with the appropriate color at the appropriate time. Examples of transflective color filters 12 that may be suitable for this type of application include but are not limited to rotating prisms, a rotating color drum, a sequential color recapture wheel, and a band modulation filter. They all have the characteristic that a number of colors, usually the three primary ones, e.g., red, green and blue, may be transmitted at one time to the display 14.

Figure 3:
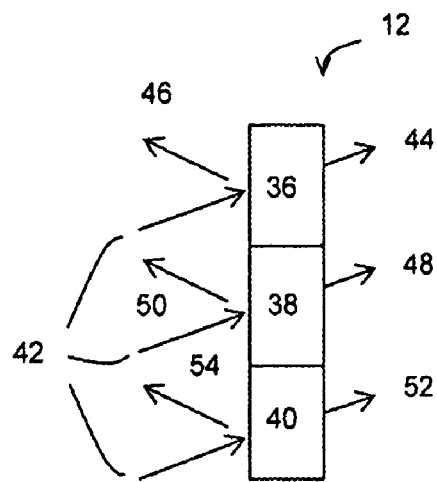
FIG. 3 is a cross-sectional view of a transflective color filter, in accordance with an embodiment of the present invention.

FIG. 3 shows a cross-sectional view of the transflective color filter 12 in accordance with one embodiment of this invention. In this embodiment the transflective color filter 12 includes a red color passband 36, a green color passband 38 and a blue color passband 40. These color passbands allow a range of frequencies corresponding to a particular color to pass through the filter while reflecting the frequencies outside of these ranges. White light 42 traveling along the incidence axis, strikes the face of the transflective color filter 12. The red passband 36 may transmit light in the red color band 44 and reflect cyan light 46, or a combination of blue and green. The green passband 38 may transmit light in the green color band 48 and reflect magenta light 50, a combination of blue and red. And finally the blue passband 40 may transmit the light in the blue color band 52 and reflect yellow light 54, a combination of red and green.

Figure 4A:
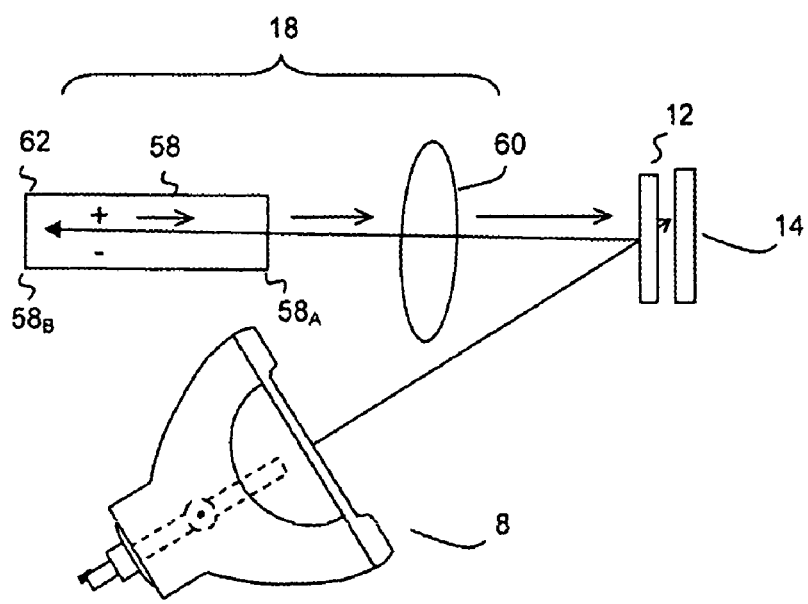
FIG. 4 is a simplified pictorial plan view of multiple variations of an illumination arrangement, including an optical integrator in the color recycling path, providing light to a display, in accordance with embodiments of the present invention.

FIG. 4 is a simplified pictorial plan view of multiple variations of an illumination arrangement, including an optical integrator in the color recycling path, providing light to a display, in accordance with embodiments of this invention. In the first embodiment depicted in FIG. 4a, a light source 8 similar to the one discussed with relation to FIG. 1, causes incident light to impinge upon the transflective color filter 12. Portions of the light containing color wavelengths that match the associated color passband are transmitted, while wavelengths outside of these passbands are reflected along the reflectance axis toward the recycling subsystem 18. In embodiments comprising R,G,B passbands, C,M,Y may be the respective reflected light.

The recycling subsystem 18 of this embodiment may include an optical element 60 at its input, an optical integrator 58, and a mirror 62. The reflected light is imaged by the optical element 60 onto an opening aperture 58a at the first end of an optical integrator 58. The optical integrator 58 of this embodiment may be a solid glass light-integrating tunnel, which integrates the reflected light through total internal reflection.

This tunnel integrator 58, may have a mirror 62 positioned at or near the second end 58b of the tunnel. A mirror may be any type of reflective surface or coating that reflects the appropriate wavelengths. The mirror 62 may be a separate optical component or it may be a coating applied to the second end 58b of the tunnel. The mirror will redirect the light back towards the opening aperture 58a. The bands of C,M,Y light may become sufficiently integrated as they travel twice the length of the tunnel before exiting. The recycled integrated light may pass back through the optical element 60 to be reintroduced to the transflective color filter 12, giving the light a second opportunity to be transmitted. In another embodiment the opening aperture 58a of the recycling integrator 58 may receive the reflected light directly from the transflective color filter 12, without going through the optical element 60.

In the above embodiment, the incident light from the light source 8 is not integrated, which may be useful in video projection systems, as the perceived brightness is larger with the increased center peak brightness. The homogenized recycled light may then increase the intensity in the corners.

Figure 4B:
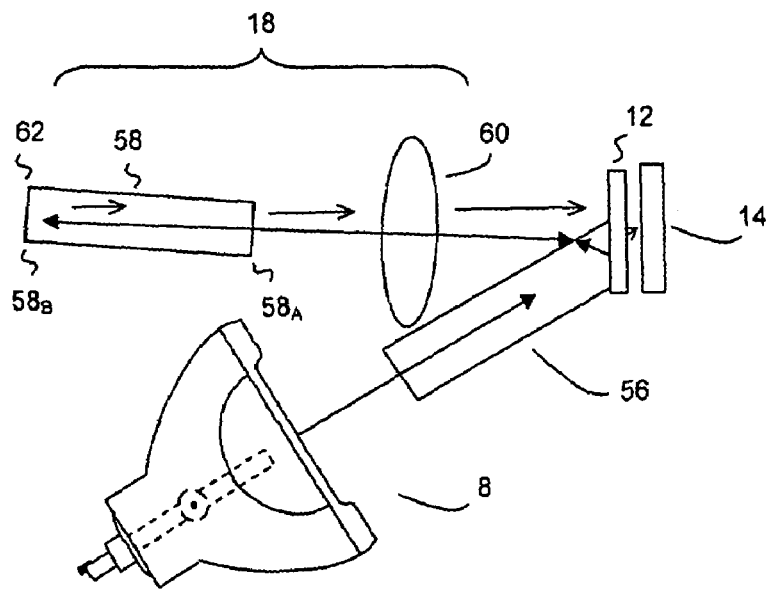

FIG. 4b depicts an embodiment that includes an optical integrator 56 on the incident light path. This optical integrator 56 may be an integrating tunnel that has a tapered cross-sectional area to suit particular applications. A typical tunnel has a rectangular cross-section and is either straight or smaller at its entrance near the light source and larger at its exit. An output aperture of the optical integrator 56 may have an aspect ratio that matches the downstream display's aspect ratio, that is, the ratio between the width and the height of the image. Although this embodiment describes a glass rod integrator, other embodiments of this invention may use a double flyseye lens integrator or any other sufficiently effective integration device that provides a substantially uniform light distribution upon exiting the integrator.

In various embodiments, outlet apertures of the optical integrator 56 may have a cross-sectional aspect ratio that provides a projection display format that is compatible with conventional display standards. Some examples of display standards include SVGA (Super Video Graphics Array), XGA (Extended Graphics Array), UXGA (Ultra XGA), WUXGA (Widescreen Ultra XGA), and HDTV (High Definition Television). These display standards are often a combination of resolution, color depth measured in bits, and refresh rate measured in hertz. SVGA, XGA, and UXGA all have aspect ratios of 4:3. HDTV has an aspect ratio of 16:9 and WUXGA is 16:10.

Figure 4C:
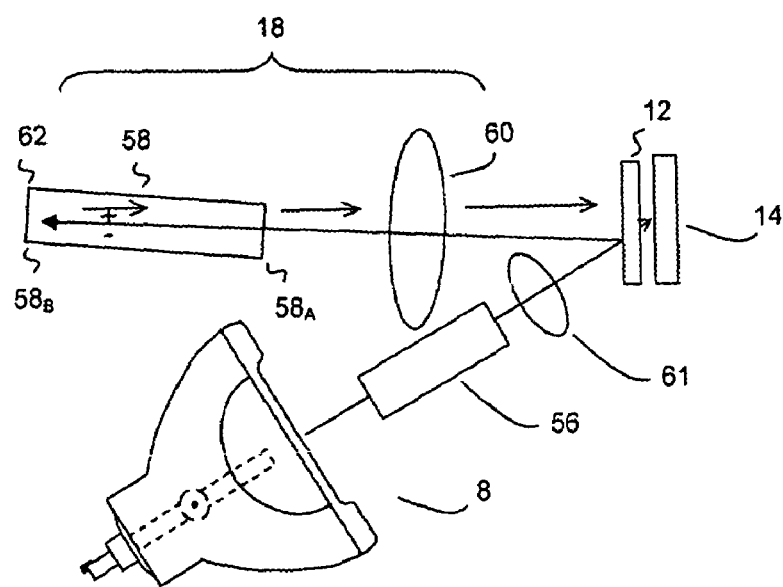

FIG. 4c depicts an embodiment similar to the one discussed in FIG. 4b, however this embodiment includes an imaging lens 61 used to focus the output aperture of the optical integrator 56 onto the display device 14.

Figure 5A:
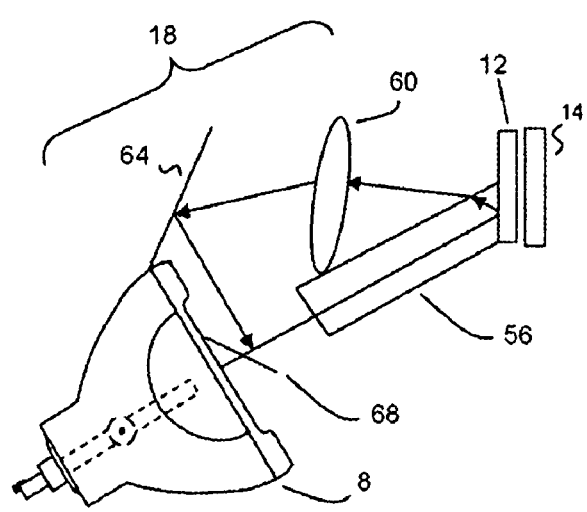
FIG. 5 is a simplified pictorial plan view of multiple variations of an illumination arrangement including a color recycling path that couples the recycled light back into the direct light path, in accordance with embodiments of the present invention.
Figure 5B:
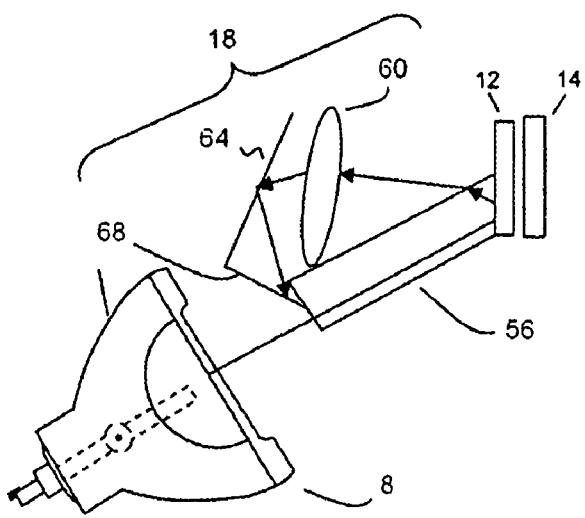
Figure 5C:
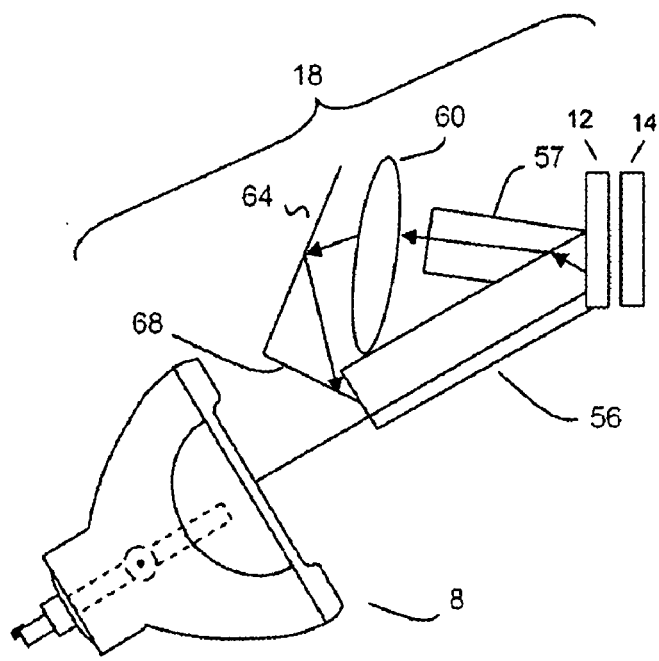

FIG. 5. is a simplified pictorial plan view of various embodiments of an illumination arrangement, including a color recycling path that couples the reflected light back into the incident light path. Specifically in the embodiments depicted by FIGS. 5a, 5b, and 5c the recycling subsystem 18 recycles the reflected light by coupling it back into the optical integrator 56 on the incident axis using a series of reflective devices 64 and 68. Referring to FIG. 5a, the recycling subsystem 18 takes advantage of the 'hole' in the center of the illumination from the light source 8. Arc lamp illumination often has a "hole in the middle" effect due to arc lamp shadowing off of the elliptical reflector. This embodiment utilizes that effect by placing a small reflector 68 in the "hole" to re-introduce the recycled light into the optical integrator 56 on the incident axis, and ultimately the transflective color filter 12. In this architecture the light may be continually recycled through the recycling subsystem until it is transmitted to the display 14. Furthermore, specifically designed optics may be used to optimize the angular properties of the recycled beam for to increase the amount of recycled light.

An alternative embodiment, depicted in FIG. 5b, shows the reflector 68 being placed close to the entrance of the optical integrator 56, only slightly reducing the amount of entrance light from the light source 8. Although these embodiments depict using reflector mirrors 64 and 68 to direct light through the recycling subsystem, other embodiments could use other types of light directing technologies, e.g. optical fibers.

The embodiment depicted in FIG. 5c is similar to FIG. 5b, however the recycling subsystem 18 includes an optical integrator 57 to integrate the light reflected by the transflective color filter 12. The optical integrator 57 may also be incorporated into the FIG. 5a embodiment.

The embodiments depicted by FIG. 5 show that the reflected light is coupled back into the integrator 56 through the end of the integrator 56. However, in an embodiment where the integrator 56 is a solid glass tunnel, it may be possible to introduce the light through the sides of the tunnel as well.

Figure 6:
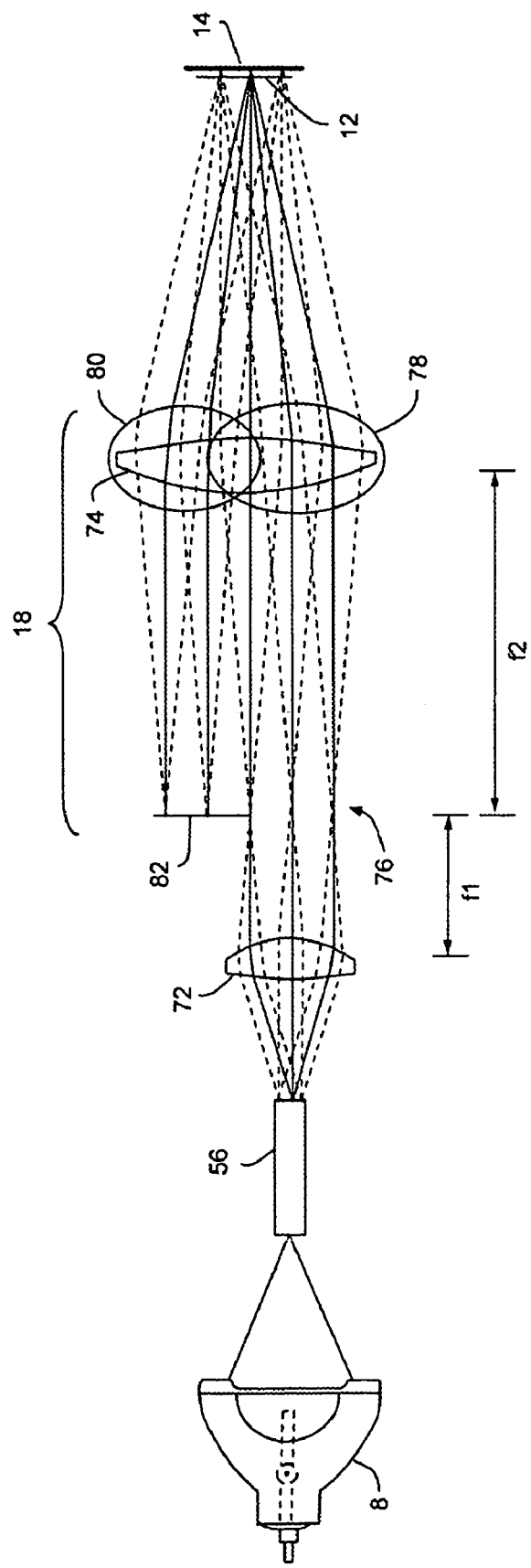
FIG. 6 is a simplified pictorial plan view of an illumination arrangement, including a color recycling subsystem with a relay optical arrangement and a mirror, providing light to a display, in accordance with an embodiment of the present invention.

FIG. 6 is a simplified pictorial plan view of an illumination arrangement, including a color recycling subsystem 18 with a relay optical arrangement 74 and a mirror 82, providing light to a display 14, in accordance with one embodiment of this invention. In brief, the embodiment depicts a relay optical arrangement 74 with various sections that are involved in both the incident and reflectance paths.

In particular, the light source 8 directs light into an optical integrator 56, such as a tunnel discussed above, which integrates the light and gives it a desired cross-sectional shape. The light exiting the tunnel 56 may be substantially telecentric due to the design of the light tunnel. However, any other source of telecentric or non-telecentric illumination can be used instead of the light source/tunnel combination discussed in this embodiment. Light from the tunnel 56 may enter an imaging lens 72 and then a relay optical arrangement 74, consisting of a relay lens in this embodiment. The two lenses 72 and 74 may be designed to create a telecentric image of the illumination from the light source at the display. The imaging lens 72 makes an intermediate image of the light source at an intermediate position 76 between the two lenses 72 and 74. The relay lens 74 then creates an image of the output of the tunnel 56 onto the display 14, with the intermediate pupil 76 imaged at infinity. Appropriate modifications can be made to the optical arrangement to accommodate the differences in light sources, optical integrators, or display sizes of various embodiments.

These lenses 72 and 74 may be singular or multiple optical components of various types, as appropriate. In one embodiment the lenses may be conventional spherical lenses. Additionally, various aspheric, diffractive, or Fresnel surfaces may be included as may be desired to achieve cost and size goals for the system. Prisms, mirrors, and additional corrective elements may also be added as appropriate to fold, bend or modify the illumination light for the intended application.

Considering the focal lengths involved in the embodiment of FIG. 6 in more detail, the imaging lens 72 has a focal length f1 that equals the distance from its focal plane to the exit aperture of the tunnel 56. Accordingly, it makes a lamp image and has its exit pupil at the position 76 that is a distance f1 away. The first section of the relay lens 78 has a focal length of f2 and is placed at that distance, f2, from the intermediate position 76 and from the display 14. The first section of the relay lens 78 re-images the pupil from the imaging lens 72, i.e. the lamp image at intermediate position 76, at infinity for telecentric illumination at the display 14. The first section 78 may be designed to image the exit aperture of the tunnel 56 at the display 14. Light travelling from the first section 78 to the display 14 will do so along an incident axis, similar to the one described with reference to FIG. 1.

As can be seen in FIG. 6, the imaging lens 72 is centered on the tunnel 56. In other words, the optical axis of the imaging lens 72 is aligned with the center of the tunnel 56, however, other configurations are possible. The relay lens 74 may be de-centered with respect to the tunnel 56 and light source 8. This causes the illumination at the display 14 to be off-axis, filling half the system's Étendue. The relay lens 74 is decentered to the point that its optical axis is near the edge of or completely outside of the optical path of the image of the source 8. This de-centering allows for the input to the recycling subsystem 18 to lie on a different axis then the incident axis. The relay lens 74 is, however, roughly centered about the display 14 as is shown in FIG. 6. This means that the light from the light source 8 arrives at the imaging lens 72 decentered with respect to the display 14 but the relay lens 74 centers the image of the light on the display 14.

The lenses need not be exactly centered with respect to the tunnel 56 or the display 14, as shown in the figures. Each one can be moved slightly if the other is so adjusted. In addition, if the transflective color filter 12 is placed at an angle then the relay lens 74 can be moved accordingly. The placement of the lenses in the illustrated embodiment may reduce the dimensions of the optical arrangement, however, the elements can be moved in a variety of different ways to meet particular size and form factor constraints of a specific embodiment.

As the incident light impinges upon the transflective color filter 12, some color bands may pass through (e.g. R, G, B), while others (e.g. C,M,Y) may be reflected along a trajectory following a reflectance axis, similar to FIG. 1 discussion. In the embodiment depicted by FIG. 6, the recycling subsystem 18 consists of a second section of the relay lens 80 and a mirror 82. In this embodiment the second section of the recycling optical arrangement has a focal length equal to the first section f2. In this embodiment the mirror 82 may be placed at the imaging focus of the second section of the relay lens 80, which is directly above the intermediate focus discussed earlier. In other embodiments the two sections of the relay optical arrangement 74 could have different focal lengths, and therefore the mirror 82 positioning would be adjusted accordingly.

The two sections of the relay lens 74 do not have to be mutually exclusive, as there can be some overlap as shown in the figure. The incident axis for certain light rays may pass through the same area of the relay lens 74 as the reflectance axis for other light rays. However, in this embodiment, each particular light ray will travel from the first section of the relay lens 78 on its incident axis, and will travel to the second section of the relay lens 80 on its reflectance axis. This will be possible by keeping the angle of incidence, Θ, less than 90 degrees. This can be done by providing the origin of the incident axis below the point that the incident axis intersects with the transflective color filter 12, as shown with the off-lens construction described above. This may also be accomplished by tilting the transflective color filter 12.

In one embodiment, the mirror 82 may be tilted slightly such that it will reflect the C,M,Y bands along a different trajectory back towards the second section of the relay lens 80. Therefore, the second section of the relay lens 80 will reintroduce the C,M,Y bands to the transflective color filter 12 at an area different than they were originally reflected from. Reintroduction at a different section of the transflective color filter 12 may result in an increase in transmitted light through the passbands. In an embodiment, the mirror 82 may be designed such that light rays reflected from the bottom portion of the transflective color filter 12 will be reflected from the mirror 82 at an upward angle so that the light is reintroduced near the top portion of the transflective color filter 12. In other embodiments of the present invention, specific calibration methods known in the art may be employed to increase the efficiencies of a particular optical architecture.

Figure 7:
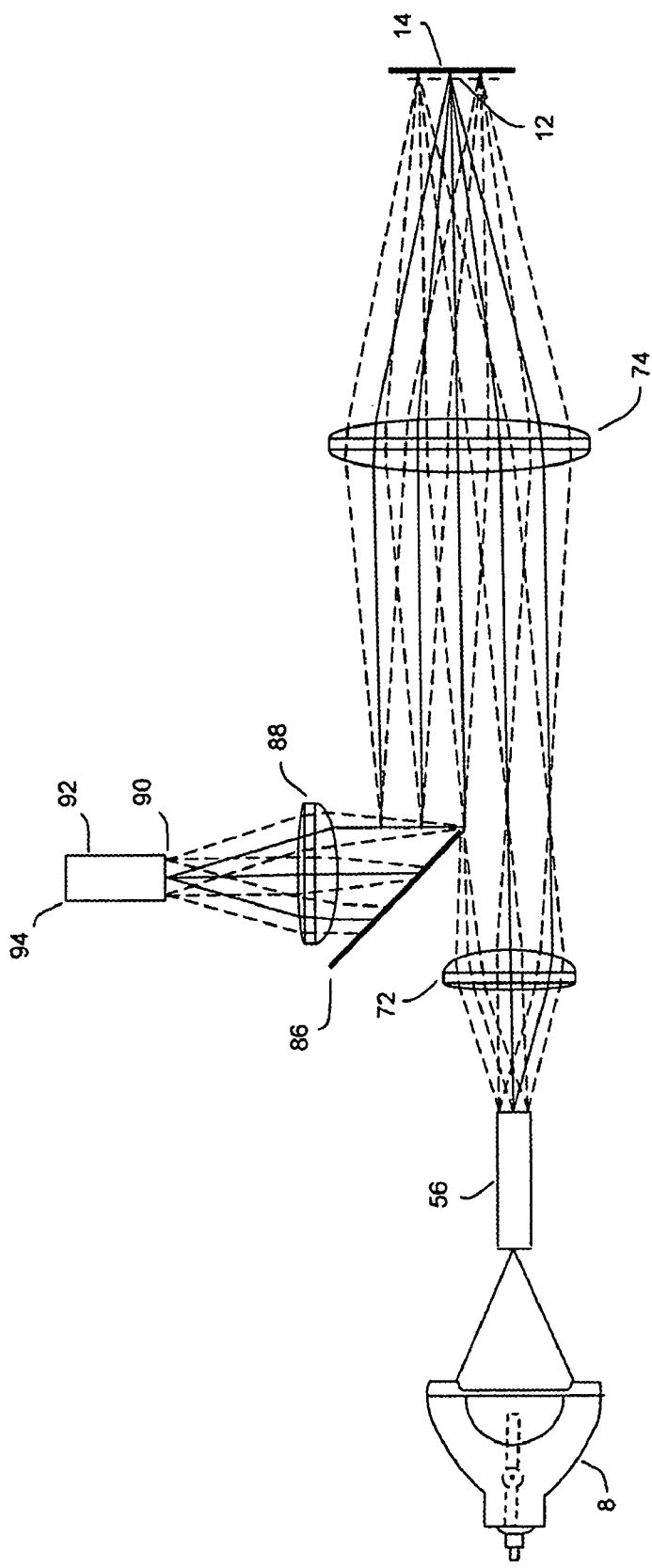
FIG. 7 is a simplified pictorial plan view of an illumination arrangement, including a color recycling subsystem with a relay optical arrangement and an optical integrator, providing light to a display, in accordance with an embodiment of the present invention.

FIG. 7 is a simplified pictorial plan view of an illumination arrangement, including a color recycling subsystem with an optical integrator 92, providing light to a display 14, in accordance with an embodiment of this invention. In this embodiment the functionality of the illumination arrangement is similar to FIG. 6, however, the mirror 82 is replaced with a fold mirror 86, a lens 88, and an optical integrator 92. The optical integrator 92 may be similar to the optical integrator 58 in FIG. 4. The lens 88 may focus the C,M,Y color bands on the input aperture of the optical integrator 90. A mirror 94 may be placed at or near the far end of the optical integrator 92 so that light is redirected back substantially along the original recycling trajectory until the integrated light is reintroduced on the transflective color filter 12. Portions of the recycled integrated light may be transmitted through the passbands of the transflective color filter 12 and impinge upon the display 14.

Figure 8:
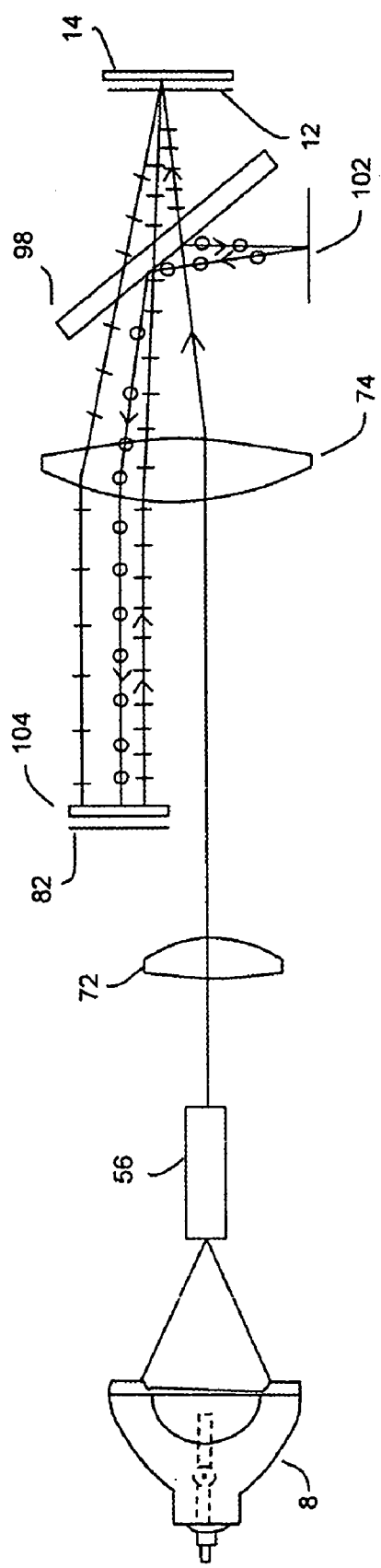
FIG. 8 is a simplified pictorial plan view of an illumination arrangement, including a color and polarization recycling subsystem, providing light to a display, in accordance with an embodiment of the present invention.

FIG. 8 depicts an embodiment of this invention that combines both polarization recovery and color recycling. This embodiment may contain a similar optical architecture as FIG. 6, however, this embodiment permits polarization recycling by the addition of a transflective polarizer 98, mirror 102, and a quarter wave plate 104. One polarization state (usually P-polarization) may be transmitted through the transflective polarizer 98 to the transflective color filter 14.

P-polarized light rays are indicated in the drawing figures by short-length transverse lines intersecting a line representing a light propagation path. The lines suggest a polarization vector that is vertically aligned in the plane of the drawing sheet. The other polarization state (usually S-polarization) is reflected towards a mirror 102. S-polarized light rays are indicated in the drawing figures by small open circles connected together by a line representing a light propagation path. The circles suggest a polarization vector normal to the plane of the drawing sheet.

The mirror 102 may then reflect the S-polarized light back to the transflective polarizer 98, which may reflect it in the direction of the source. With the off-set lens construction it may pass through a quarter wave plate 104 that rotates the polarization direction to substantially the P-polarization, and may then be reflected by a mirror 82 back toward the transflective polarizer 98 where it may be transmitted to the transflective color filter 12.

The quarter wave plate 104 or some other polarization conversion device may be placed anywhere between the mirror 82 and the transflective polarizer 98. This could also be a quarter-wave film or coating placed on the mirror. The system could include a polarizing analyzer behind the display, such as an iodine-based PVA (poly-vinyl alcohol) film, or a wire grid polarizer to filter out any stray S-polarized light, enhancing contrast. Analyzers and polarizing filters may also be placed in other locations of the system as may be appropriate for a particular application or illumination system.

The transflective polarizer 98 may be, e.g. a prism-type or a plate-type polarizing beam splitter, or any other type of device which will allow substantially all the light of one polarization state to pass, while reflecting substantially all the light of another, substantially perpendicular, polarization state. Examples of the plate-type PBS include, but are not limited to, a wire-grid polarizer, a cholesteric polarizer, a polymer film stack, or a dielectric coating stack.

Many types of transflective polarizers and polarizing beam splitters may have angular dependent transmissive ranges that differ between orthogonal axes. In one axis, e.g. the horizontal, a greater range of incident light angles may be transmitted than in the other orthogonal axis, e.g. the vertical. The elliptical hotspot properties discussed above may be exploited by properly positioning the polarizing materials so that the axis of the greater angular transmission characteristic or the greater angular acceptance is aligned with the angular intensity distribution of the illumination. Stated another way, the transmissivity of the system is improved by matching the direction of the elongation of the hot spots to the direction of the high contrast isocontrast curve of the particular polarizer. This may increase efficiency that may be accompanied by a commensurate increase in brightness and contrast.

Figure 9:
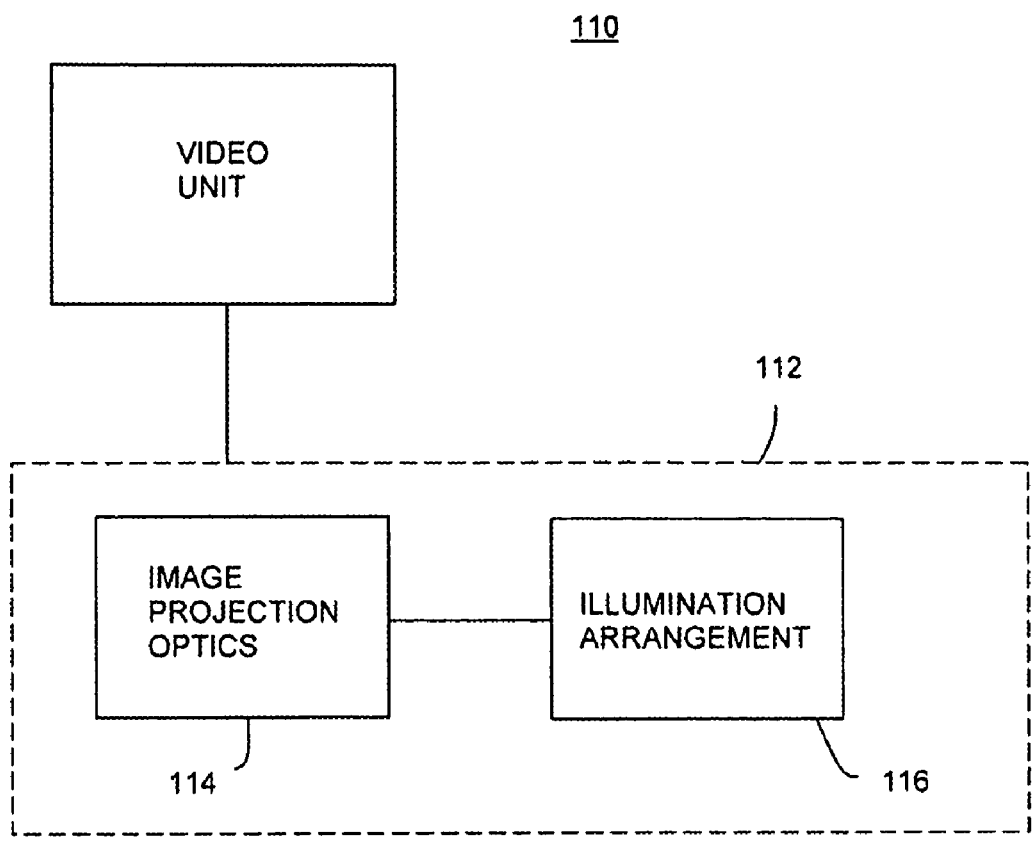
FIG. 9 is a simplified pictorial plan view of a video projection system showing a video unit coupled to a projection system that includes image projection optics and an illumination arrangement, in accordance with an embodiment of the present invention.

FIG. 9 is a simplified pictorial plan view of a system including a video unit 110 coupled to a projection system 112, in accordance with an embodiment of the present invention. In this embodiment a video unit 110 transmits video signals to the projection system 112, which includes image projection optics 114 and an illumination arrangement 116. The illumination arrangement 116 may be similar to any one of the various embodiments described under the teachings of this invention. In one embodiment the image projection optics 114 may include a transmissive liquid crystal light valve arrangement coupled to a projection lens, to image the light valve on a screen. In other embodiments the image projection optics 114 could include reflective, rather than transmissive displays. The video unit 110 may include a personal or laptop computer, DVD, set-top box (STB), video camera, video recorder, or any other suitable device to transmit video signals to the projector. The system may be used as a projector for computer generated slides and for digital sourced imagery; however, many other applications such as games, movies, television, advertising and data display can be made.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a light source to generate light;
   a transflective color filter optically coupled to the light source, to receive the light along an incident axis, said transflective color filter including at least one color passband to transmit at least a portion of light within a range of frequencies, and to reflect, along a reflectance axis, at least a portion of light outside of the range of frequencies, with the incident and the reflectance axes being non-coincident; and
   a recycling subsystem optically coupled to the transflective color filter, having an input positioned on the reflectance axis and an output, the recycling subsystem to receive the reflected light through the input, and to emit recycled light through the output towards the transflective color filter.

2. The apparatus of claim 1, wherein the transflective color filter is one of a group consisting of a rotating color drum, a rotating spiral color wheel, and a band modulation filter.

3. The apparatus of claim 1, wherein the transflective color filter includes at least one of a group consisting of a red, a green and a blue passband.

4. The apparatus of claim 1, further comprising:
   a display optically coupled to the transflective color filter to receive the transmitted light from the transflective color filter.

5. The apparatus of claim 4, wherein the display is a transmissive liquid crystal light valve.

6. The apparatus of claim 4, further comprising:
   the display being substantially centered on an optical axis;
   a relay optical arrangement, positioned substantially on a first side of the optical axis of the display, to receive the light from the light source and transmit the light, along the incident axis, toward the transflective color filter; and
   the input of the recycling subsystem being disposed on a second side of the optical axis of the display.

7. The apparatus of claim 6, further comprising:
   a relay lens substantially centered on the optical axis of the display; and
   the input of the recycling subsystem and the relay optical arrangement both including sections of the relay lens.

8. The apparatus of claim 6, further comprising:
   an optical integrator to receive light from the light source and transmit the light toward an imaging lens, the imaging lens to transmit the light toward the relay optical arrangement.

9. The apparatus of claim 6, wherein the recycling subsystem further comprises
   a first mirror to receive a portion of the reflected light from the input of the recycling subsystem and redirect it back towards the input of the recycling subsystem; and
   the input of the recycling subsystem being substantially the same as the output of the recycling subsystem.

10. The apparatus of claim 9, wherein the recycling subsystem further comprises:
    an optical integrator having a first end to receive the light from the input of the recycling subsystem; and
    the first mirror placed on or near a second end of the optical integrator to reflect the light back through the optical integrator towards the first end.

11. The apparatus of claim 10, wherein the recycling subsystem further comprises:
    a fold mirror to receive the light from the input of the recycling subsystem and to reflect the light towards an imaging lens, the imaging lens to image the light on the first end of the optical integrator.

12. The apparatus of claim 9, wherein the first mirror is slightly tilted such that the light is redirected back toward the input of the recycling subsystem on a slightly different path.

13. The apparatus of claim 9, further comprising:
    a second mirror;
    a transflective polarizer, to receive light from the relay optical arrangement, to transmit light in a first polarization state towards the transflective color filter, and to reflect light in a second polarization state towards the second mirror;

the second mirror being adapted to reflect light in the second polarization state back towards the transflective polarizer, resulting in the light reflecting off of the transflective polarizer toward the input of the recycling subsystem; and a quarter wave plate between the first mirror and the input of the recycling subsystem, to change light in the second polarization state to the first polarization state.

14. The apparatus of claim 13, wherein the quarter wave plate comprises a coating on the first mirror.

15. The apparatus of claim 1, further comprising a first optical integrator including an input and output aperture, the input aperture to receive light from the light source, and the output aperture to transmit light toward the transflective color filter.

16. The apparatus of claim 15, wherein the recycling subsystem further comprises a second optical integrator having a first end to receive the reflected light from the transflective color filter.

17. The apparatus of claim 16, wherein the recycling subsystem includes a mirror placed on or near a second end of the second optical integrator to reflect light back through the second optical integrator towards the first end and out towards the transflective color filter.

18. The apparatus of claim 17, wherein the recycling subsystem includes an optical element to image the reflected light from the transflective color filter on the first end of the second optical integrator.

19. The apparatus of claim 15, wherein the output of the recycling subsystem is optically coupled to the first optical integrator.

20. A method comprising:

generating light from a light source;

receiving the light along an incident axis with a transflective color filter, transmitting light within a range of frequencies and reflecting light that is outside of the range of frequencies, along a reflectance axis that is non-coincident with the incident axis; and recycling the reflected light by reintroducing it to the transflective color filter.

21. The method of claim 20, wherein recycling the reflected light includes integrating the reflected light before reintroducing it to the transflective color filter.

22. The method of claim 20, wherein recycling the reflected light includes reintroducing the light along a recycling axis which is non-coincident with the reflectance axis.

23. The method of claim 22, further comprising transmitting light of one polarization direction towards the transflective color filter;

reflecting light of a second polarization direction; and recycling the light of a second polarization direction by changing it to the first polarization direction and transmitting it towards the transflective color filter.

24. The method of claim 22, wherein the recycling axis is substantially coincident with the incident axis.

25. The method of claim 24, further comprising integrating the light travelling along the incident axis.

* * * * *

UNITED STATES PATENT AND TRADEMARK OFFICE
CERTIFICATE OF CORRECTION

PATENT NO. : 7,144,133 B2 Page 1 of 1
APPLICATION NO. : 10/804661
DATED : December 5, 2006
INVENTOR(S) : Serge J A Bierhuizen It is certified that error appears in the above-identified patent and that said Letters Patent is hereby corrected as shown below:

Col. 12, ln. 24 [Claim 23] "... transfiective ..." should read "... transflective ..."

Signed and Sealed this

Third Day of March, 2009

JOHN DOLL
*Acting Director of the United States Patent and Trademark Office*